United States Patent
Gooch

(10) Patent No.: US 11,507,070 B2
(45) Date of Patent: *Nov. 22, 2022

(54) INDUSTRIAL PLANT CONTROLLER

(71) Applicant: Andritz Inc., Alpharetta, GA (US)

(72) Inventor: Arthur Gooch, Richmond (CA)

(73) Assignee: Andritz Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/324,859

(22) Filed: May 19, 2021

(65) Prior Publication Data

US 2021/0271234 A1 Sep. 2, 2021

Related U.S. Application Data

(63) Continuation of application No. 16/710,992, filed on Dec. 11, 2019, now Pat. No. 11,036,214.

(60) Provisional application No. 62/779,148, filed on Dec. 13, 2018.

(51) Int. Cl.
*G06F 9/44* (2018.01)
*G06F 9/455* (2018.01)
*G06F 9/445* (2018.01)
*G05B 19/418* (2006.01)
*G06N 3/08* (2006.01)

(52) U.S. Cl.
CPC ......... *G05B 19/41885* (2013.01); *G06N 3/08* (2013.01)

(58) Field of Classification Search
CPC ........ G06N 3/08; G06N 3/0454; G06N 3/006; G06N 20/00; G06N 7/005; G05B 19/41885
See application file for complete search history.

(56) References Cited

U.S. PATENT DOCUMENTS

| 9,008,840 B1 | 4/2015 | Ponulak |
| 9,358,685 B2 | 6/2016 | Meier |
| 9,904,785 B2 * | 2/2018 | Chand .................. H04L 9/3236 |

(Continued)

FOREIGN PATENT DOCUMENTS

| WO | WO2017114810 | 7/2017 |
| WO | WO2018215665 | 11/2018 |

OTHER PUBLICATIONS

Sinha et al., Requirements-Aided Automatic Test Case Generation for Industrial Cyber-physical Systems, 4 pages (Year: 2015).*

(Continued)

*Primary Examiner* — Thuy Dao
(74) *Attorney, Agent, or Firm* — Fish & Richardson, P.C.

(57) ABSTRACT

Methods, systems, and apparatus, including computer programs encoded on a computer storage medium, for training an industrial plant controller that controls operation of an industrial plant. In one aspect, a method comprises generating training data using an industrial plant simulation model that simulates operation of the industrial plant. The industrial plant controller is trained by a reinforcement learning technique using the training data. The industrial plant controller is configured to process an input comprising a state vector characterizing a state of the industrial plant in accordance with a plurality of industrial plant controller parameters to generate an action selection policy output that defines a control action to be performed to control the operation of the industrial plant.

22 Claims, 5 Drawing Sheets

(56) References Cited

U.S. PATENT DOCUMENTS

| | | | |
|---|---|---|---|
| 10,885,432 B1 * | 1/2021 | Dulac-Arnold | G06N 3/084 |
| 11,036,214 B2 | 6/2021 | Gooch | |
| 2010/0070098 A1 | 3/2010 | Volkmar et al. | |
| 2013/0325773 A1 | 12/2013 | Oleg et al. | |
| 2017/0151618 A1 | 6/2017 | Kenichiro | |
| 2020/0065156 A1 | 2/2020 | Nag | |
| 2020/0074241 A1 | 3/2020 | Mahmood | |
| 2020/0192340 A1 | 6/2020 | Gooch | |

OTHER PUBLICATIONS

PCT International Preliminary Report on Patentability in International Appln. No. PCT/US2019/065772, dated Jun. 8, 2021, 8 pages.

Controldesign.com [online], "Siemens and startup Bonsai create autotuning CNC machine using AI", May 2, 2018, [retrieved Dec. 4, 2019], retrieved from: URL <https://www.controldesign.com/industrynews/2018/siemens-and-startup-bonsai-create-autotuning-cnc-machine-using-ai/> 8 pages.

International Search Report and Written Opinion in International Application No. PCT/US2019/065772, dated Apr. 7, 2020, 14 pages.

Micropsi-industries.com [online], "Process Prediction and Control", Published on or before Dec. 4, 2019, [retrieved Dec. 4, 2019], retrieved from : URL<https://www.micropsi-industries.com/process-control.html> 3 pages.

OpenAI.com [online], "OpenAI Five", Jun. 25, 2018, [retrieved Dec. 4, 2019], retrieved from: URL<https://openai.com/blog/openai-five/> 13 pages.

Li et al., "Industrial robotic assembly process modeling using support vector regression", 2014, 6 pages.

* cited by examiner

INDUSTRIAL PLANT CONTROLLER

CROSS REFERENCE TO RELATED APPLICATION

This application is a continuation of U.S. patent application Ser. No. 16/710,992, entitled, "INDUSTRIAL PLANT CONTROLLER" filed Dec. 11, 2019, which claims priority to U.S. Provisional Application No. 62/779,148, filed on Dec. 13, 2018, the entire contents of which is hereby incorporated by reference.

BACKGROUND

This specification relates to control systems used to control the operation of industrial plants.

An industrial plant can be any facility that processes materials (e.g., chemically, mechanically, electrically, or a combination thereof) to generate a processed output. Examples of industrial plants include smelting plants, paper mills, and oil refineries. A control system of an industrial plant can select control actions to be performed to control the operation of the industrial plant.

SUMMARY

This specification describes a system implemented as computer programs on one or more computers in one or more locations that trains an industrial plant controller that controls the operation of an industrial plant.

According to a first aspect there is provided a method, performed by one or more data processing apparatus, for training an industrial plant controller that controls operation of an industrial plant. The method includes generating training data using an industrial plant simulation model that simulates operation of the industrial plant. Generating the training data includes, at each of multiple time steps: processing, using the industrial plant simulation model, (i) a current state vector characterizing a simulated state of the industrial plant at the current time step, and (ii) a control action to be performed at the current time step; generating, using the industrial plant simulation model, a subsequent state vector characterizing the simulated state of the industrial plant after the control action is performed; and determining a reward received at the current time step based on at least the subsequent state vector characterizing the simulated state of the industrial plant after the control action is performed. The industrial plant controller is trained by a reinforcement learning technique using the training data. The industrial plant controller is configured to process an input comprising a state vector characterizing a state of the industrial plant in accordance with industrial plant controller parameters to generate an action selection policy output that defines a control action to be performed to control the operation of the industrial plant.

In some implementations, the training includes adjusting values of the industrial plant controller parameters to increase a measure of cumulative reward received by performing control actions defined by action selection policy outputs generated by the industrial plant controller.

In some implementations, the training data is generated using multiple instances of the industrial plant simulation model running in parallel.

In some implementations, generating the training data further includes, at one or more particular time steps: adjusting the current state vector to simulate occurrence of an event affecting the operation of the industrial plant.

In some implementations, the event includes an equipment failure in the industrial plant.

In some implementations, at each particular time step, the event is determined by sampling from a probability distribution over a predetermined set of possible events, wherein the possible events include a non-event that does not affect the operation of the industrial plant.

In some implementations, the rewards received at the time steps characterize how effectively the control actions performed at the time steps accomplish certain tasks.

In some implementations, the method further includes: determining whether the industrial plant controller passes one or more certification tests, where a certification test assesses whether the industrial plant controller can effectively control the operation of the industrial plant by generating control actions in accordance with current values of the industrial plant controller parameters; and using the industrial plant controller to control the operation of the industrial plant in response to determining that the industrial plant controller passes the certification tests.

In some implementations, the method further includes using the industrial plant controller to control the operation of the industrial plant, including, at each of multiple given time steps: obtaining a state vector characterizing a state of the industrial plant at the given time step; processing an input including the state vector characterizing the state of the industrial plant at the given time step using the industrial plant controller to generate an action selection policy output; and determining a control action to be performed at the given time step based on the action selection policy output.

In some implementations, the action selection policy output includes a respective score for each control action in a predetermined set of possible control actions.

In some implementations, determining a control action to be performed based on the action selection policy output includes selecting a control action with a highest score.

In some implementations, the industrial plant controller includes one or more neural networks, and the industrial plant controller parameters include weight values of the one or more neural networks.

According to a second aspect there is provided a system including: one or more computers; and one or more storage devices communicatively coupled to the one or more computers, where the one or more storage devices store instructions that, when executed by the one or more computers, cause the one or more computers to train an industrial plant controller that controls operation of an industrial plant by performing operations including the operations of the previously described method.

According to a third aspect there is provided one or more non-transitory computer storage media storing instructions that when executed by one or more computers cause the one or more computers to train an industrial plant controller that controls operation of an industrial plant by performing operations including the operations of the previously described method.

Particular embodiments of the subject matter described in this specification can be implemented so as to realize one or more of the following advantages.

The training system described in this specification can train an industrial plant controller used to control the operation of an industrial plant using training data generated by one or more simulation systems that numerically simulate the operation of the industrial plant. The training system can generate large quantities of training data by, for example, running multiple simulation systems in parallel and running the simulations systems faster than the "real-time" speed at which the industrial plant actually operates. The large quantities of training data that can be generated by the simulation systems greatly exceeds the limited quantities of real-world (i.e., non-simulated) training data that could be obtained by logging data characterizing the real-world operation of the industrial plant. The training system can use the large quantities of training data generated using the simulation systems to train the controller to control the industrial plant more effectively than if the training system used only real-world training data.

The training system described in this specification can train an industrial plant controller to respond effectively to a large variety of events that affect the operation of the industrial plant (e.g., equipment failures or input material changes), without having to actually experience those events. In particular, the training system can simulate the occurrence of many thousands of events, which could affect the operation of the industrial plant using the simulation systems, and thereafter train the controller to respond effectively to the occurrence of these events. In contrast, human operators of industrial plants may be ill-prepared to respond effectively to certain events that affect the operation of the industrial plant. For example, certain events may occur relatively rarely during real-world operation of the industrial plant, so human operators may lack experience in responding to these events. However, the training system described in this specification can train the controller to respond effectively to these rare events by exposing the controller to them many thousands of times in different simulations. More specifically, the simulations can enable training on events that would render an industrial plant inoperable, which is not feasible using real-world data.

The training system described in this specification can generate highly diverse sets of training data by simulating the operation of the industrial plant when control actions are selected in accordance with an "exploration strategy" (e.g., where some control actions are selected randomly). In this manner, the training system enables the controller to "explore" the space of possible control actions and their simulated consequences on the industrial plant before the controller is deployed to control the real-world operation of the industrial plant. If the controller were directly trained to control the operation of the industrial plant without the benefit of simulated training data, the controller could not implement an exploration strategy in selecting control actions since poorly chosen control actions could damage the industrial plant or cause it to operate unsafely.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
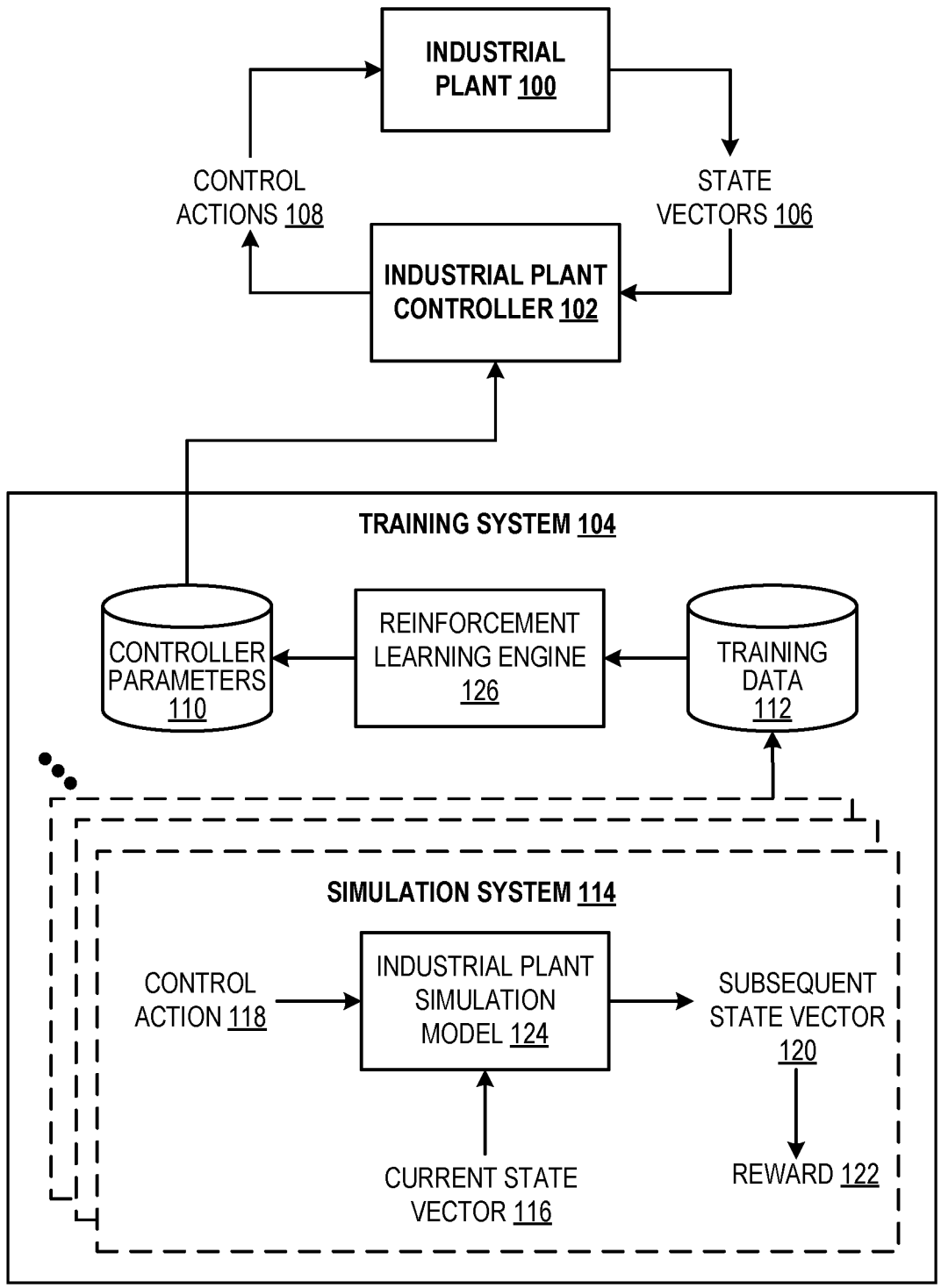
FIG. 1 is a block diagram of an example industrial plant, an example industrial plant controller that controls the operation of the industrial plant, and an example training system for training the industrial plant controller.

FIG. 1 is a block diagram of an example industrial plant 100, an example industrial plant controller 102 that controls the operation of the industrial plant 100, and an example training system 104 for training the industrial plant controller 102. The industrial plant controller 102 and the training system 104 are examples of systems that can be implemented as computer programs on one or more computers in one or more locations in which the systems, components, and techniques described below are implemented.

The industrial plant controller 102 is configured to process state vectors 106 characterizing the state of the industrial plant 100 to generate control actions 108 that control the operation of the industrial plant 100. The controller 102 processes the state vectors 106 in accordance with values of a set of industrial plant controller parameters 110 that are determined by the training system 104. As will be described in more detail below, the training system 104 can determine the values of the controller parameters 110 by reinforcement learning techniques (or other learning techniques) based on training data 112 generated using one or more simulation systems 114 that simulate the operation of the industrial plant 100.

The industrial plant 100 can be any facility that processes materials (e.g., chemically, mechanically, electrically, or a combination thereof) to generate a processed output. For example, the industrial plant 100 may be a smelting plant used to process ore to extract metals. As another example, the industrial plant 100 may be a pulp mill used to process wood into wood pulp. As another example, the industrial plant 100 may be an oil refinery used to process crude oil into refined products (e.g., gasoline, diesel, heating oil, and the like). As another example, the industrial plant 100 may be used to process potash to generate fertilizer.

A state vector 106 characterizes the state of the industrial plant 100 at a particular time step. For convenience, the state vectors 106 are referred to in this specification as "vectors", but in general they can be represented in any appropriate numerical format (e.g., as vectors, matrices, or higher-order tensors). The state vectors 106 can be generated based on the outputs of sensors located in the industrial plant 100 and can characterize any aspects of the industrial plant 100. For example, a state vector 106 can characterize fluid pressures and flow rates (e.g., in pipes) in the industrial plant 100, chemical compositions of substances (e.g., in vats) in the industrial plant 100, and valve positions (e.g., open or closed) in the industrial plant 100.

The controller 102 controls the operation of the industrial plant 100 by, at each of multiple time steps, processing a state vector 106 characterizing the state of the industrial plant 100 at the time step to generate one or more control actions 108. The control actions 108 define actions to be performed to control the operation of the industrial plant 100. For example, the control actions 108 could include changing the positions of valves (e.g., by opening or closing them) in the industrial plant 100, changing the speed of mixers (e.g., used to mix the contents of vats) in the industrial plant 100, or changing the temperature in certain places in the industrial plant 100 (e.g., by activating heating or cooling systems). For convenience, the description that follows will refer to the controller 102 generating a single control action 108 at each time step, but multiple control actions can also be generated at each time step. In some cases, the controller 102 independently controls the operation of the industrial plant 100, while in other cases, the controller 102 controls the operation of the industrial plant 100 in conjunction with human operators. For example, some or all of the control actions 108 generated by the controller 102 may be subject to manual supervision by a human operator prior to being performed in the industrial plant 100. An example process for controlling the operation of the industrial plant 100 using the controller 102 is described further with reference to FIG. 4.

For convenience, FIG. 1 depicts the controller 102 as separate from the industrial plant 100. However, the hardware and software components implementing the controller 102 can be positioned in any appropriate locations. For example, some or all of the components implementing the controller 102 may be positioned in the industrial plant 100. As another example, some or all of the components implementing the controller 102 may be positioned remotely from the industrial plant 100 (e.g., in a cloud computing environment). The industrial plant 100 may transmit the state vectors 106 characterizing the state of the industrial plant 100 to the controller 102 using any appropriate communication medium (e.g., a wired or wireless connection). Similarly, the controller 102 may transmit data defining the control actions 108 to the industrial plant 100 using any appropriate communication medium (e.g., a wired or wireless connection).

The controller 102 can be implemented as any model having parameters that can be trained using reinforcement learning techniques and that can be configured to generate control actions 108 that control the operation of the industrial plant 100. For example, the controller 102 can be implemented as a neural network system that generates control actions 108 by processing state vectors 106 characterizing the state of the industrial plant 100 using one or more neural networks. When the controller 102 is implemented as a neural network system, the controller parameters 110 may define the values of the weights of the neural networks included in the neural network system.

The training system 104 determines the values of the controller parameters 110 using reinforcement learning techniques based on training data 112 generated by one or more simulation systems 114. Broadly, a simulation system 114 approximates the behavior of the industrial plant 100 by generating "simulated" state vectors that characterize predicted states of the industrial plant 100 if particular control actions are performed, and generates "rewards" that characterize how effectively the particular control actions accomplish certain tasks. Examples of tasks may include starting up the industrial plant 100, shutting down the industrial plant 100, and optimizing continuous operation of the industrial plant 100. The one or more simulation systems 114 can run in parallel to generate training data 112. For clarity, the description that follows will refer to a single simulation system 114, but in general, the training system 104 can use multiple simulation systems 114 to generate training data 112.

The training data 112 includes data defining one or more "simulated trajectories" generated by the simulation system 114. The simulation system 114 is configured to generate simulated trajectories that define, for each of one or more simulated time steps: (i) a current state vector 116, (ii) a control action 118, (iii) a subsequent state vector 120, and (iv) a reward 122. The current state vector 116 characterizes a simulated state of the industrial plant 100 at the simulated time step, and the subsequent state vector 120 characterizes a simulated state of the industrial plant 100 after the control action 118 is performed. The simulation system 114 can generate the subsequent state vector 120 by processing the current state vector 116 and the control action 118 using a simulation model 124. The simulation system 114 can determine the control action 118 at the simulated time step in any appropriate manner, for example, by processing the current state vector 116 at the simulated time step using the controller 102 in accordance with current values of the controller parameters 110. The reward 122 received at each simulated time step can be represented in any appropriate numerical format (e.g., as a numerical value), and is generated by the simulation system 114 based on at least the subsequent state vector 120 at the simulated time step. Using a simulation system 114 to generate simulated trajectories is described in more detail with reference to FIG. 2.

In some cases, the training data 112 may additionally include data defining one or more "real trajectories" that are obtained from logged data characterizing the actual operation of the industrial plant 100 (i.e., rather than being generated by the simulation system 114). More specifically, the current state vector, control action, and subsequent state vector corresponding to each time step in a real trajectory may be obtained from logged data characterizing the operation of the industrial plant 100. The control actions in the real trajectories may, for example, be control actions selected by human operators of the industrial plant 100. The training system 104 may derive a reward for each time step in a real trajectory using the same procedure as for the simulated trajectories (as will be described in more detail with reference to FIG. 2).

The training system 104 uses a reinforcement learning engine 126 to iteratively adjust the values of the controller parameters 110 based on the training data 112, in particular, based on the simulated trajectories generated by the simulation system 114. More specifically, the reinforcement learning engine 126 adjusts the values of the controller parameters 110 to increase a measure of cumulative reward that would be received by performing control actions selected in accordance with the values of the controller parameters 110. By adjusting the values of the controller parameters 110 in this manner, the reinforcement learning engine 126 can determine trained values of the controller parameters 110 that enable the controller 102 to effectively control the operation of the industrial plant 100. Training the controller 102 by iteratively adjusting the values of the controller parameters 110 based on training data 112 that includes simulated trajectories generated by the simulation system 114 is described further with reference to FIG. 3.

During operation of the industrial plant 100, various "events" may occur that may alter the operation of the industrial plant 100, for example, equipment failures or input material changes. To train the controller 102 to respond appropriately to such events, the simulation system 114 can generate simulated trajectories (i.e., which are included in the training data 112 used to train the controller 102) that include these events. For example, as will be described further with reference to FIG. 2, the simulation system 114 can simulate an event at a time step by adjusting the current state vector 106 for the time step to reflect the occurrence of the event.

After the training system 104 determines trained values of the controller parameters 110, the training system 104 can transmit the trained values of the controller parameters 110 to the controller 102 using any appropriate communication medium (e.g., a wired or wireless connection). The hardware and software components implementing the training system 104 can be positioned in any appropriate location, for example, in a cloud computing environment. After receiving the trained values of the controller parameters 110, the controller 102 can control the operation of the industrial plant 100 by generating control actions in accordance with the trained values of the controller parameters 110.

Before using the controller 102 to control the operation of the industrial plant 100 using control actions 108 generated in accordance with the values of the controller parameters 110, the training system 104 may determine whether the controller 102 passes one or more certification tests. A certification test can be used to assess whether the controller 102 can effectively control the operation of the industrial plant 100 by generating control actions 108 in accordance with the current values of the controller parameters 110, as will be described in more detail with reference to FIG. 3. The training system 104 may determine the controller 102 has been sufficiently trained to control the operation of the industrial plant 100 when the controller 102 passes the certification tests.

Figure 2:
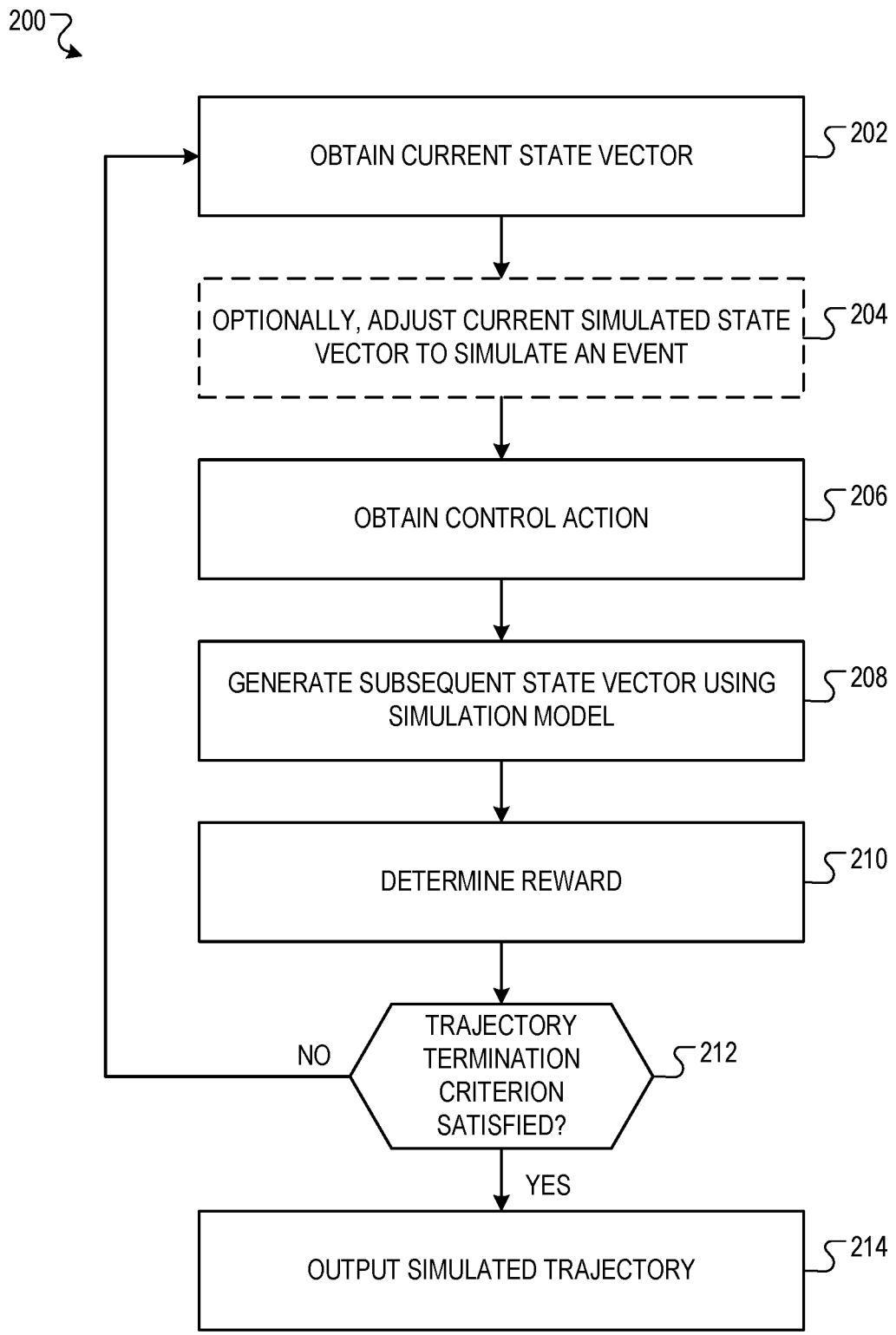
FIG. 2 is a flow diagram of an example process for generating a simulated trajectory.

FIG. 2 is a flow diagram of an example process 200 for generating a simulated trajectory. For convenience, the process 200 will be described as being performed by a system of one or more computers located in one or more locations. For example, a simulation system, e.g., the simulation systems 114 of FIG. 1, appropriately programmed in accordance with this specification, can perform the process 200.

The system obtains the current state vector at the current simulated time step (202). The manner in which the system obtains the current state vector depends on whether the current simulated time step is the first simulated time step in the trajectory, or is after the first simulated time step in the trajectory. If the current simulated time step is the first simulated time step in the trajectory, the system can determine the current state vector using any appropriate predetermined procedure. As another example, the system may determine the current state vector to be a predetermined state vector reflecting a particular state of the industrial plant, for example, the state of being shut down or the state of operating at a certain production level. If the current simulated time step is after the first simulated time step in the trajectory, the system determines the current state vector at the current simulated time step to the "subsequent state vector" (i.e., as described with reference to 208) generated at the previous simulated time step.

Optionally, the system adjusts the current state vector to simulate the occurrence of an "event" affecting the operation of the industrial plant (204). The event affecting the operation of the industrial plant may be, for example, an equipment failure (e.g., a valve breaking) or a change in the input materials processed by the industrial plant (e.g., a change in the chemical composition of crude oil being refined by the industrial plant). In a particular example, to simulate the failure of a valve in the industrial plant, the system may adjust the current state vector by changing the value of a component of the current state vector that characterizes the position of the valve (e.g., from closed to open). In this example, the system may further prevent the value of the component of the current state vector that characterizes the position of the valve from being changed as a result of control actions performed at subsequent simulated time steps. As another example, to simulate a change in the chemical composition of crude oil being refined by the industrial plant, the system may adjust the current state vector by randomly modifying the values of components of the current state vector that characterize the chemical composition of the crude oil.

The system can determine whether to adjust the current state vector to simulate the occurrence of an event affecting operation of the industrial plant in accordance with a probability distribution defining respective likelihoods of each of a predetermined set of possible events. The predetermined set of possible events may include a "non-event" option that covers the possibility that no event affecting operation of the industrial plant occurs at the simulated time step. The system may sample an event (or non-event) from the predetermined set of possible events at the time step, and adjust (or not adjust) the current state vector to simulate the effect of the sampled event (or non-event).

The system obtains a control action to be performed at the simulated time step (206). The control action defines an action to be performed at the simulated time step to control the operation of the simulated industrial plant. The system can obtain the control action to be performed at the simulated time step in any appropriate manner. For example, the system can process the current state vector at the simulated time step (e.g., as obtained in 202) using the controller (e.g., in accordance with the current values of the controller parameters) to generate the control action to be performed at the simulated time step. In this example, the system may randomly modify (or otherwise adjust) the control actions generated by the controller in accordance with an "exploration strategy". For example, the system may use an epsilon-greedy exploration strategy defined by a small constant parameter $\epsilon \in (0,1)$. In this example, the system may determine the control action to be performed at the simulated time step to be the control action generated by the controller with probability $1-\epsilon$, or a random action with probability $\epsilon$. By using an exploration strategy to determine the control actions to be performed at simulated time steps, the system can generate a more diverse set of trajectories that can enable the controller to be trained more effectively.

The system uses an industrial plant simulation model to process: (i) the current state vector, and (ii) the control action, to generate a subsequent state vector characterizing the simulated state of the industrial plant after the control action is performed (i.e., at the next simulated time step) (208). The system can use any appropriate industrial plant simulation model to generate the subsequent state vector characterizing the simulated state of the industrial plant after the control action is performed. In some cases, the industrial plant simulation model is a numerical optimization system that is configured to determine the subsequent state vector as the solution of an optimization problem. The form of the optimization problem may be determined by physical principles (e.g., the conservation laws of fluid dynamics) based on the design of the industrial plant.

The system determines a reward received at the simulated time step based on at least the subsequent state vector characterizing the simulated state of the industrial plant after the control action is performed (210). The reward can be represented in any appropriate numerical format, for example, as a numerical value. A cumulative measure (e.g., a discounted sum) of the rewards received at each of the simulated time steps in the trajectory can be understood to characterize how effectively the control actions performed at the time steps accomplish certain tasks. Examples of tasks may include starting up the industrial plant, shutting down of the industrial plant, and maintaining stable operation of the industrial plant.

In a particular example, the system may generate a reward for the simulated time step corresponding to the task of maintaining stable operation of the industrial plant. In this example, the system may determine the reward as a function (e.g., a weighted sum) of factors derived from the subsequent state vector, including: (i) an output rate of the industrial plant, (ii) a variation in the output rate, and (iii) a safety factor of the industrial plant. The output rate of the industrial plant refers to the rate at which the industrial plant generates a processed output (e.g., pounds/minute of processed wood pulp). The variation in the output rate of the industrial plant refers to a measure of variance (e.g., a standard deviation) in the output rate of the industrial plant over a window of time preceding the current simulated time step. The safety factor of the industrial plant refers to a measure of how safely the industrial plant is operating. In a particular example, one or more components of the state vector characterizing the simulated state of the industrial plant may be associated with numerical intervals defining safe operating regimes (e.g., a range of safe temperature values). The value of the safety factor may be reduced if any component of the subsequent state vector fails to conform to the numerical interval defining its safe operating regime.

The system determines whether a termination criterion has been met for the simulated trajectory (212). For example, the system may determine the termination criterion has been met for the simulated trajectory when it has been rolled out for a predetermined number of simulated time steps. As another example, the system may determine the termination criterion has been met for the simulated trajectory when the subsequent state vector characterizing the simulated state of the industrial plant after the control action is performed is within a threshold distance of (or is identical to) a predetermined goal state vector. In a particular example, the predetermined goal state vector may correspond to the industrial plant being shut down.

When the system determines the termination criterion is not satisfied, the system can return to step 202 and repeat the preceding steps. When the system determines that the termination criterion is satisfied, the system can output the simulated trajectory for use in training the controller (214).

Figure 3:
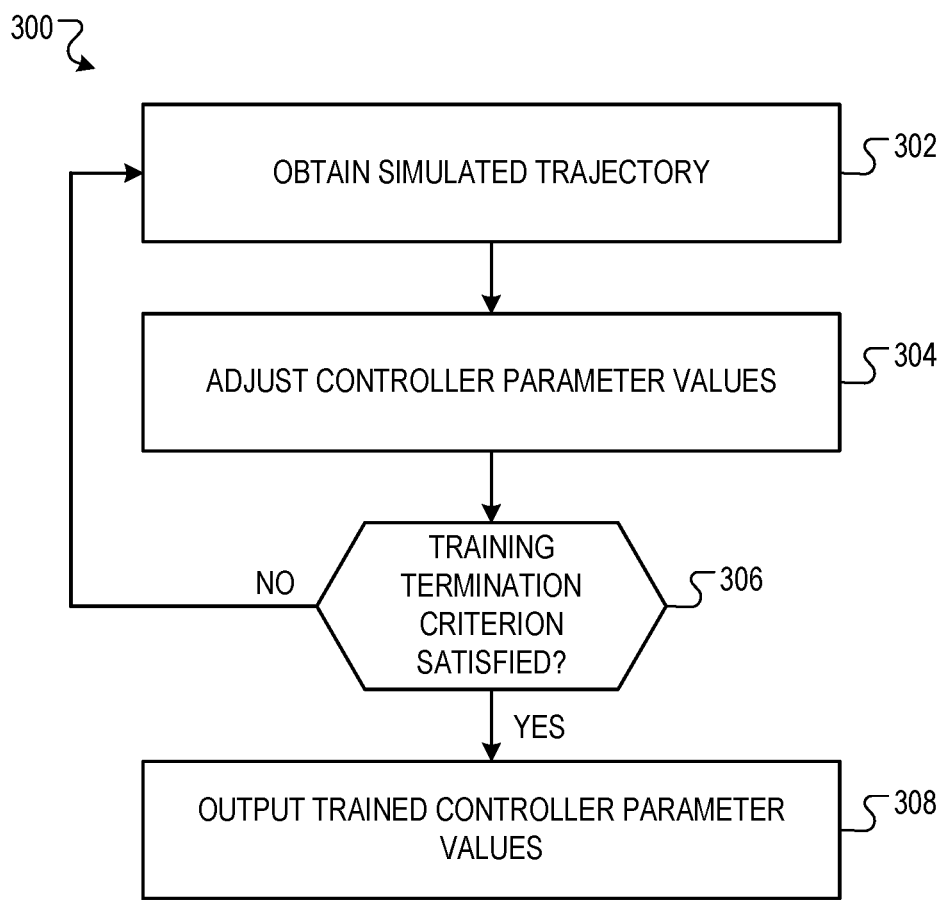
FIG. 3 is a flow diagram of an example process for training an industrial plant controller to perform a particular task using simulated trajectories.

FIG. 3 is a flow diagram of an example process 300 for training an industrial plant controller to perform a particular task using simulated trajectories. Examples of tasks may include starting up the industrial plant, shutting down the industrial plant, and maintaining stable operation of the industrial plant. For convenience, the process 300 will be described as being performed by a system of one or more computers located in one or more locations. For example, a training system, e.g., the training system 104 of FIG. 1, appropriately programmed in accordance with this specification, can perform the process 300.

The system obtains a simulated trajectory that defines, for each of one or more simulated time steps: (i) a current state vector, (ii) a control action, (iii) a subsequent state vector, and (iv) a reward, as described with reference to FIG. 1 (302). For example, the system may obtain the simulated trajectory by randomly sampling the simulated trajectory from the training data. The values of the rewards characterize how effectively the control actions in the simulated trajectory accomplish the particular task.

The system adjusts the current values of the controller parameters based on the simulated trajectory using a reinforcement learning technique (304). More specifically, the system adjusts the current values of the controller parameters to increase a measure of cumulative reward received by performing actions determined in accordance with the values of the controller parameters. When the controller is a neural network system and the controller parameters define the weights of the neural network system, adjusting the current values of the controller parameters may include determining a gradient of a loss function and using the gradient to adjust the current values of the controller parameters. The system may determine the gradient of the loss function using any appropriate method (e.g., backpropagation), and the system can use any appropriate optimization method to adjust the current values of the controller parameters using the gradient (e.g., the Adam optimization method). The system can use any appropriate reinforcement learning technique, including both on-policy and off-policy reinforcement learning techniques, such as policy gradient techniques and Q-learning techniques.

The system determines whether a training termination criterion is satisfied (306). For example, the system may determine the training termination criterion is satisfied if the controller, selecting control actions in accordance with the current values of the controller parameters, passes one or more certification tests. A certification test can be used to assess whether the controller can effectively control the operation of the industrial plant by generating control actions in accordance with the current values of the controller parameters.

In one example, a certification test can define: (i) an initial state vector characterizing an initial state of the industrial plant, (ii) a set of "goal" state vectors characterizing acceptable states of the industrial plant after a predetermined number of time steps, and optionally, (iii) one or more events affecting the operation of the industrial plant. The system can generate a simulated trajectory (e.g., as described with reference to FIG. 2) starting with the initial state vector by selecting the actions to be performed at each simulated time step using the current values of the controller parameters. If the certification test defines events affecting the operation of the industrial plant, the system can adjust the state vectors of the simulated trajectory to simulate the occurrence of these events (e.g., as described with reference to FIG. 2). The system can determine that the controller passes the certification test if the state vector characterizing the simulated state of the industrial plant after the predetermined number of time steps is within a threshold distance of (or identical to) one or more of the goal state vectors. In a particular example, the certification test may be a test to determine whether the controller can start up the industrial plant, in which case the initial state vector may reflect the industrial plant being shut down and the goal state vectors may reflect the industrial plant being started up.

In response to determining that the training termination criterion is not satisfied, the system can return to step 302 and repeat the preceding steps. In response to determining that the training termination criterion is satisfied, the system can output the trained values of the controller parameters (308). For example, the system can transmit the trained values of the controller parameters to the controller used to control the operation of the industrial system (e.g., over a wired or wireless connection).

Figure 4:
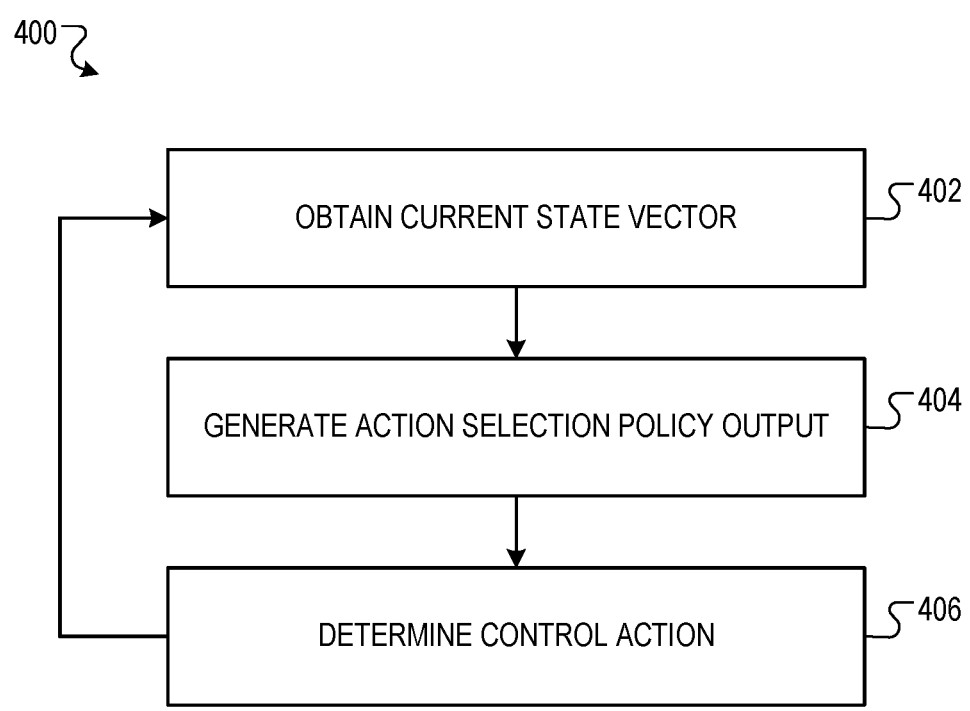
FIG. 4 is a flow diagram of an example process for using an industrial plant controller to control the operation of an industrial plant.

FIG. 4 is a flow diagram of an example process 400 for using an industrial plant controller to control the operation of an industrial plant. For convenience, the process 400 will be described as being performed by a controller that includes one or more computers located in one or more locations. For example, an industrial plant controller, e.g., the industrial plant controller 102 of FIG. 1, appropriately programmed in accordance with this specification, can perform the process 400.

The controller obtains a current state vector characterizing the current state of the industrial plant (402). The current state vector can be generated by sensors located in the industrial plant and can characterize any aspects of the industrial plant. For example, the current state vector can characterize fluid pressures and flow rates (e.g., in pipes) in the industrial plant, chemical compositions of substances (e.g., in vats) in the industrial plant, and valve positions (e.g., open or closed) in the industrial plant.

The controller processes the current state vector in accordance with trained values of a set of controller parameters to generate an action selection policy output (404). The action selection policy output defines a respective score for each control action in a predetermined set of possible control actions. The controller may generate the action selection policy output by processing the current state vector using an action selection neural network. In a particular example, the action selection neural network may be a Q neural network that is configured to generate an action selection policy output that defines a respective Q value for each control action in the predetermined set of possible control actions. The Q value for a control action may define an estimate of a cumulative measure (e.g., discounted sum) of rewards received after the current time step if the control action is performed at the current time step.

The system determines a control action to be performed at the time step based on the action selection policy output (406). For example, the system may process the control action scores defined by the action selection policy output using a soft-max function to determine a respective probability value for each control action. After generating a respective probability value for each control action, the system may determine the control action to be performed at the time step by sampling a control action in accordance with the determined probability values. As another example, the system may determine the control action to be performed at the time step as the control action with the highest control action score as defined by the action selection policy output.

Figure 5:
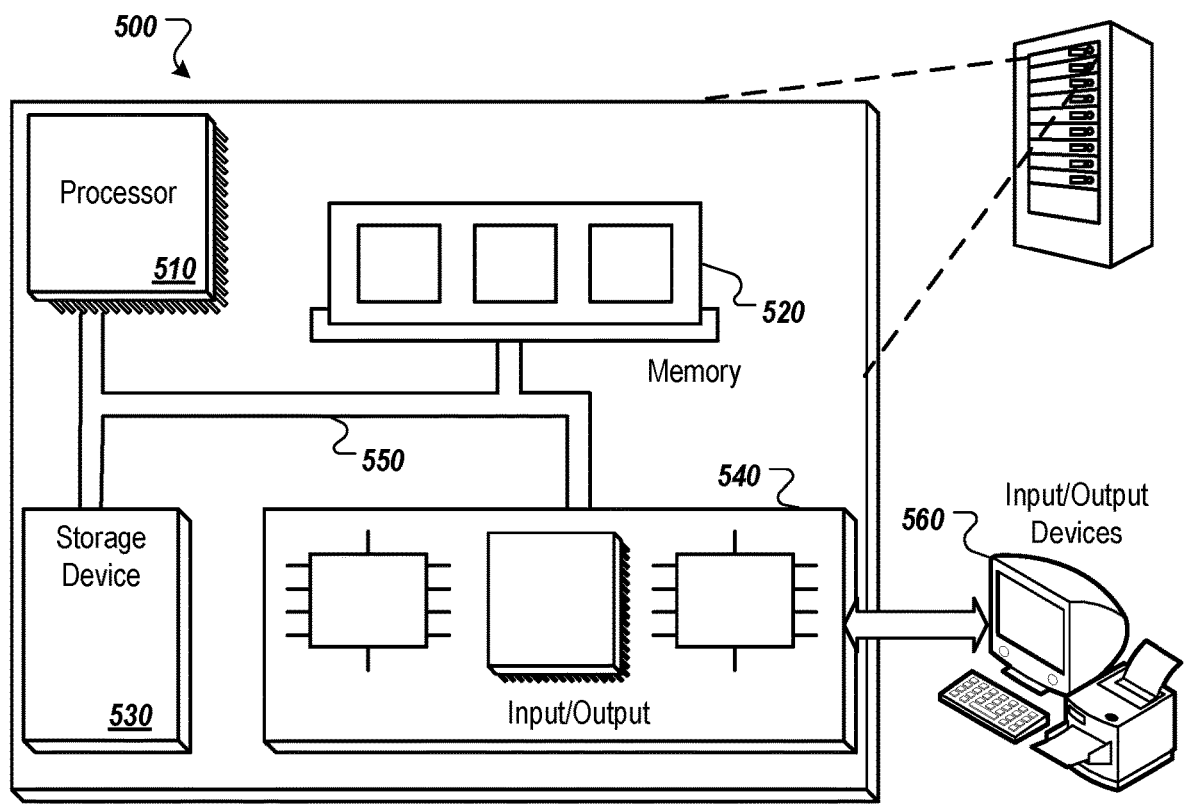
FIG. 5 is a block diagram of an example computing system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for controlling an industrial plant using an industrial plant controller having a plurality of industrial plant controller parameters, the method comprising, at each of a plurality of time steps:
   receiving a current state vector characterizing a state of the industrial plant at the time step;
   processing the current state vector using the industrial plant controller, in accordance with values of the plurality of industrial plant controller parameters, to generate an action selection policy output; and
   selecting a control action to be performed at the time step to control operation of the industrial plant based on the action selection policy output;
   wherein the industrial plant controller has been trained by operations comprising:
      generating training data using an industrial plant simulation model that simulates operation of the industrial plant; and
      training the industrial plant controller by a reinforcement learning technique using the training data;
      determining whether the industrial plant controller passes one or more certification tests, wherein a certification test assesses whether the industrial plant controller can effectively control the operation of the industrial plant by generating control actions in accordance with current values of the plurality of industrial plant controller parameters; and
      using the industrial plant controller to control the operation of the industrial plant in response to determining that the industrial plant controller passes the certification tests.

2. The method of claim 1, wherein generating training data using the industrial plant simulation model that simulates operation of the industrial plant comprises, at each of a plurality of simulated time steps:
   processing, using the industrial plant simulation model, (i) a current state vector characterizing a simulated state of the industrial plant at the simulated time step, and (ii) a control action to be performed at the simulated time step;
   generating, using the industrial plant simulation model, a subsequent state vector characterizing the simulated state of the industrial plant after the control action is performed; and
   determining a reward received at the simulated time step based on at least the subsequent state vector characterizing the simulated state of the industrial plant after the control action is performed.

3. The method of claim 2, wherein generating the training data further comprises, at one or more of the simulated time steps:
   adjusting the current state vector to simulate occurrence of an event affecting operation of the industrial plant.

4. The method of claim 3, wherein the event comprises an equipment failure in the industrial plant.

5. The method of claim 3, wherein the event is determined by sampling from a probability distribution over a predetermined set of possible events, wherein the possible events include a non-event that does not affect the operation of the industrial plant.

6. The method of claim 2, wherein the rewards received at the simulated time steps characterize how effectively the control actions performed at the simulated time steps accomplish certain tasks.

7. The method of claim 1, wherein training the industrial plant controller by the reinforcement learning technique using the training data comprises:
   adjusting values of the plurality of industrial plant controller parameters to increase a measure of cumulative reward received by performing control actions defined by action selection policy outputs generated by the industrial plant controller.

8. The method of claim 1, wherein the training data is generated using multiple instances of the industrial plant simulation model running in parallel.

9. The method of claim 1, wherein at each of the plurality of time steps, the action selection policy output at the time step comprises a respective score for each control action in a predetermined set of possible control actions.

10. The method of claim 9, wherein at each of the plurality of time steps, selecting the control action to be performed at the time step to control operation of the industrial plant based on the action selection policy output comprises:
   selecting a control action with a highest score according to the action selection policy output at the time step.

11. The method of claim 1, wherein the industrial plant controller comprises one or more neural networks, and the industrial plant controller parameters comprise weight values of the one or more neural networks.

12. A system comprising:
   one or more computers; and
   one or more storage devices communicatively coupled to the one or more computers, wherein the one or more storage devices store instructions that, when executed by the one or more computers, cause the one or more computers to perform operations for controlling an industrial plant using an industrial plant controller having a plurality of industrial plant controller parameters, the operations comprising, at each of a plurality of time steps:
      receiving a current state vector characterizing a state of the industrial plant at the time step;
      processing the current state vector using the industrial plant controller, in accordance with values of the plurality of industrial plant controller parameters, to generate an action selection policy output; and selecting a control action to be performed at the time step to control operation of the industrial plant based on the action selection policy output;

wherein the industrial plant controller has been trained by operations comprising:
generating training data using an industrial plant simulation model that simulates operation of the industrial plant; and
training the industrial plant controller by a reinforcement learning technique using the training data;
determining whether the industrial plant controller passes one or more certification tests, wherein a certification test assesses whether the industrial plant controller can effectively control the operation of the industrial plant by generating control actions in accordance with current values of the plurality of industrial plant controller parameters; and
using the industrial plant controller to control the operation of the industrial plant in response to determining that the industrial plant controller passes the certification tests.

13. The system of claim 12, wherein generating training data using the industrial plant simulation model that simulates operation of the industrial plant comprises, at each of a plurality of simulated time steps:
processing, using the industrial plant simulation model, (i) a current state vector characterizing a simulated state of the industrial plant at the simulated time step, and (ii) a control action to be performed at the simulated time step;
generating, using the industrial plant simulation model, a subsequent state vector characterizing the simulated state of the industrial plant after the control action is performed; and
determining a reward received at the simulated time step based on at least the subsequent state vector characterizing the simulated state of the industrial plant after the control action is performed.

14. The system of claim 13, wherein generating the training data further comprises, at one or more of the simulated time steps:
adjusting the current state vector to simulate occurrence of an event affecting operation of the industrial plant.

15. The system of claim 14, wherein the event comprises an equipment failure in the industrial plant.

16. The system of claim 14, wherein the event is determined by sampling from a probability distribution over a predetermined set of possible events, wherein the possible events include a non-event that does not affect the operation of the industrial plant.

17. One or more non-transitory computer storage media storing instructions that when executed by one or more computers cause the one or more computers to perform operations for controlling an industrial plant using an industrial plant controller having a plurality of industrial plant controller parameters, the operations comprising, at each of a plurality of time steps:
receiving a current state vector characterizing a state of the industrial plant at the time step;
processing the current state vector using the industrial plant controller, in accordance with values of the plurality of industrial plant controller parameters, to generate an action selection policy output; and
selecting a control action to be performed at the time step to control operation of the industrial plant based on the action selection policy output;

wherein the industrial plant controller has been trained by operations comprising:
generating training data using an industrial plant simulation model that simulates operation of the industrial plant; and
training the industrial plant controller by a reinforcement learning technique using the training data;
determining whether the industrial plant controller passes one or more certification tests, wherein a certification test assesses whether the industrial plant controller can effectively control the operation of the industrial plant by generating control actions in accordance with current values of the plurality of industrial plant controller parameters; and
using the industrial plant controller to control the operation of the industrial plant in response to determining that the industrial plant controller passes the certification tests.

18. The non-transitory computer storage media of claim 17, wherein generating training data using the industrial plant simulation model that simulates operation of the industrial plant comprises, at each of a plurality of simulated time steps:
processing, using the industrial plant simulation model, (i) a current state vector characterizing a simulated state of the industrial plant at the simulated time step, and (ii) a control action to be performed at the simulated time step;
generating, using the industrial plant simulation model, a subsequent state vector characterizing the simulated state of the industrial plant after the control action is performed; and
determining a reward received at the simulated time step based on at least the subsequent state vector characterizing the simulated state of the industrial plant after the control action is performed.

19. The non-transitory computer storage media of claim 18, wherein generating the training data further comprises, at one or more of the simulated time steps:
adjusting the current state vector to simulate occurrence of an event affecting operation of the industrial plant.

20. A method performed by one or more data processing apparatus for controlling an industrial plant using an industrial plant controller having a plurality of industrial plant controller parameters, the method comprising, at each of a plurality of time steps:
receiving a current state vector characterizing a state of the industrial plant at the time step;
processing the current state vector using the industrial plant controller, in accordance with values of the plurality of industrial plant controller parameters, to generate an action selection policy output; and
selecting a control action to be performed at the time step to control operation of the industrial plant based on the action selection policy output;

wherein the industrial plant controller has been trained by operations comprising:
generating training data using an industrial plant simulation model that simulates operation of the industrial plant, comprising, at each of a plurality of simulated time steps:
processing, using the industrial plant simulation model, (i) a current state vector characterizing a simulated state of the industrial plant at the simulated time step, and (ii) a control action to be performed at the simulated time step;

generating, using the industrial plant simulation model, a subsequent state vector characterizing the simulated state of the industrial plant after the control action is performed; and determining a reward received at the simulated time step based on at least the subsequent state vector characterizing the simulated state of the industrial plant after the control action is performed; and training the industrial plant controller by a reinforcement learning technique using the training data.

21. A method performed by one or more data processing apparatus for controlling an industrial plant using an industrial plant controller having a plurality of industrial plant controller parameters, the method comprising, at each of a plurality of time steps:

receiving a current state vector characterizing a state of the industrial plant at the time step;

processing the current state vector using the industrial plant controller, in accordance with values of the plurality of industrial plant controller parameters, to generate an action selection policy output; and selecting a control action to be performed at the time step to control operation of the industrial plant based on the action selection policy output;

wherein the industrial plant controller has been trained by operations comprising:

generating training data using an industrial plant simulation model that simulates operation of the industrial plant; and training the industrial plant controller by a reinforcement learning technique using the training data, comprising:

adjusting values of the plurality of industrial plant controller parameters to increase a measure of cumulative reward received by performing control actions defined by action selection policy outputs generated by the industrial plant controller.

22. A method performed by one or more data processing apparatus for controlling an industrial plant using an industrial plant controller having a plurality of industrial plant controller parameters, the method comprising, at each of a plurality of time steps:

receiving a current state vector characterizing a state of the industrial plant at the time step;

processing the current state vector using the industrial plant controller, in accordance with values of the plurality of industrial plant controller parameters, to generate an action selection policy output; and selecting a control action to be performed at the time step to control operation of the industrial plant based on the action selection policy output, comprising:

selecting a control action with a highest score according to the action selection policy output at the time step;

wherein the industrial plant controller has been trained by operations comprising:

generating training data using an industrial plant simulation model that simulates operation of the industrial plant; and training the industrial plant controller by a reinforcement learning technique using the training data.

* * * * *